(12) United States Patent
Li et al.

(10) Patent No.: US 12,422,583 B2
(45) Date of Patent: Sep. 23, 2025

(54) CHARACTERIZATION SYSTEM AND METHOD FOR CASING LOADING USING ENTROPY ANALYSIS

(71) Applicant: Baker Hughes Oilfield Operations LLC, Houston, TX (US)

(72) Inventors: Baoyan Li, Houston, TX (US); Elan Yogeswaren, Houston, TX (US); Dalila Balmaceda, Katy, TX (US); Wei Han, Houston, TX (US); Roger Steinsiek, Houston, TX (US); Joseph Olaiya, Houston, TX (US); Marc Ramirez, Houston, TX (US); Sushant Dutta, Sugar Land, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 395 days.

(21) Appl. No.: 17/968,427

(22) Filed: Oct. 18, 2022

(65) Prior Publication Data
US 2024/0125965 A1    Apr. 18, 2024

(51) Int. Cl.
*G01V 1/50* (2006.01)
*E21B 47/005* (2012.01)

(52) U.S. Cl.
CPC .............. *G01V 1/50* (2013.01); *E21B 47/005* (2020.05); *G01V 2210/1299* (2013.01); *G01V 2210/1429* (2013.01); *G01V 2210/60* (2013.01)

(58) Field of Classification Search
CPC ............. G01V 1/50; G01V 2210/1299; G01V 2210/1429; G01V 2210/60; E21B 47/005
See application file for complete search history.

(56) References Cited

U.S. PATENT DOCUMENTS

| | | | |
|---|---|---|---|
| 11,674,377 B2* | 6/2023 | Yogeswaren | ........ G01N 29/323 73/152.58 |
| 11,828,158 B2* | 11/2023 | Li | .......................... E21B 47/005 |
| 12,049,817 B2* | 7/2024 | Radtke | .................... E21B 49/00 |
| 2019/0033484 A1 | 1/2019 | Stoller | |
| 2022/0034217 A1 | 2/2022 | Manders | |

FOREIGN PATENT DOCUMENTS

| | | |
|---|---|---|
| WO | 2008/111066 | 9/2008 |
| WO | 2022/035953 | 2/2022 |

OTHER PUBLICATIONS

International Search Report and Written Opinion mailed Feb. 5, 2024 in corresponding PCT Application No. PCT/US2023/075971.
Waloski et al., "Identification of Rock Mass Critical Discontinuities While Borehole Drilling," May 11, 2021, Energies, vol. 14, pp. 1-21.

* cited by examiner

*Primary Examiner* — Elias Desta
(74) *Attorney, Agent, or Firm* — Hogan Lovells US LLP

(57) ABSTRACT

In at least one embodiment, a well inspection method and system is disclosed. The method includes transmitting an acoustic signal from a well inspection tool into a casing structure, receiving return signals from the casing structure to the well inspection tool, performing, using at least one processor associated with the well inspection tool, a Fast Fourier Transform (FFT) on a plurality of frequencies of the return signals to generate spectrogram data, determining entropy spectra from the spectrogram data, and determining casing loadings associated with the casing structure based at least in part on the entropy spectra.

20 Claims, 7 Drawing Sheets

CHARACTERIZATION SYSTEM AND METHOD FOR CASING LOADING USING ENTROPY ANALYSIS

BACKGROUND

1. Technical Field

This disclosure relates generally to oilfield equipment and more particularly to systems and methods for evaluating cement-bonding or casing loadings through tubing or multiple casings.

2. Description of the Prior Art

Evaluation of cement-bonding quality can be a challenging process as it requires interpretation of acoustic measurements to evaluate cement-bonding quality in a casing structure for certain wells, such as for plugged and abandoned (P&A) wells. As major brown-oil and gas fields enter a decommission phase, operators may need more cost-effective cement evaluation tools for P&A wells. Acoustic tools may require single-casing logging environment, where a tubing or a liner may need to be removed from a well. There may be considerable costs involved with such removal of a tubing or liner from a well, and more so when a well is located offshore. A frequency-domain analysis to acoustic signals may be used to extract frequency responses of a variable density log (VDL) tool, such as in a frequency range of [10, 18] kilohertz (KHz), to associate them to one or more cement-bonding conditions in a casing having a tubing. Further, a segmented acoustic tool may be used to provide azimuthal cement quality mapping of a casing for dual pipe logging environments. Still further, combined processes of logging data of pulse-echo mode waveforms and of pitch-catch mode waveforms acquired by sensors of an ultrasonic tool may be an approach used to address evaluation of cement-bonding and casing loadings. In another example, non-harmonic resonant techniques may be used to improve the sensitivity of responses of such tools to cement bonding conditions of casing.

SUMMARY

In at least one embodiment, a well inspection method is disclosed. The method includes transmitting an acoustic signal from a well inspection tool into a casing structure. Then, return signals are received from the casing structure using the well inspection tool. The method includes performing, using at least one processor associated with the well inspection tool, a Fast Fourier Transform (FFT) on a plurality of frequencies of the return signals to generate spectrogram data. Further, entropy spectra are determined from the spectrogram data as part of the method herein. The method includes determining casing loading associated with the casing structure based at least in part on the entropy spectra.

In at least one embodiment, a system for well inspection is also disclosed. The system includes a transmitter to transmit an acoustic signal into a casing structure, a receiver to receive return signals from the casing structure to the well inspection tool, and at least one processor and memory including instructions that when executed by the at least one processor enable the system to perform functions described herein. In at least one embodiment, such functions include to perform a Fast Fourier Transform (FFT) on a plurality of frequencies of the return signals to generate spectrogram data. A further function is to determine entropy spectra from the spectrogram data. Yet another function is to determine casing loading associated with the casing structure based at least in part on the entropy spectra

BRIEF DESCRIPTION OF DRAWINGS

Some of the features and benefits of the present disclosure having been stated, others will become apparent as the description proceeds when taken in conjunction with the accompanying drawings, in which.

Figure 1:
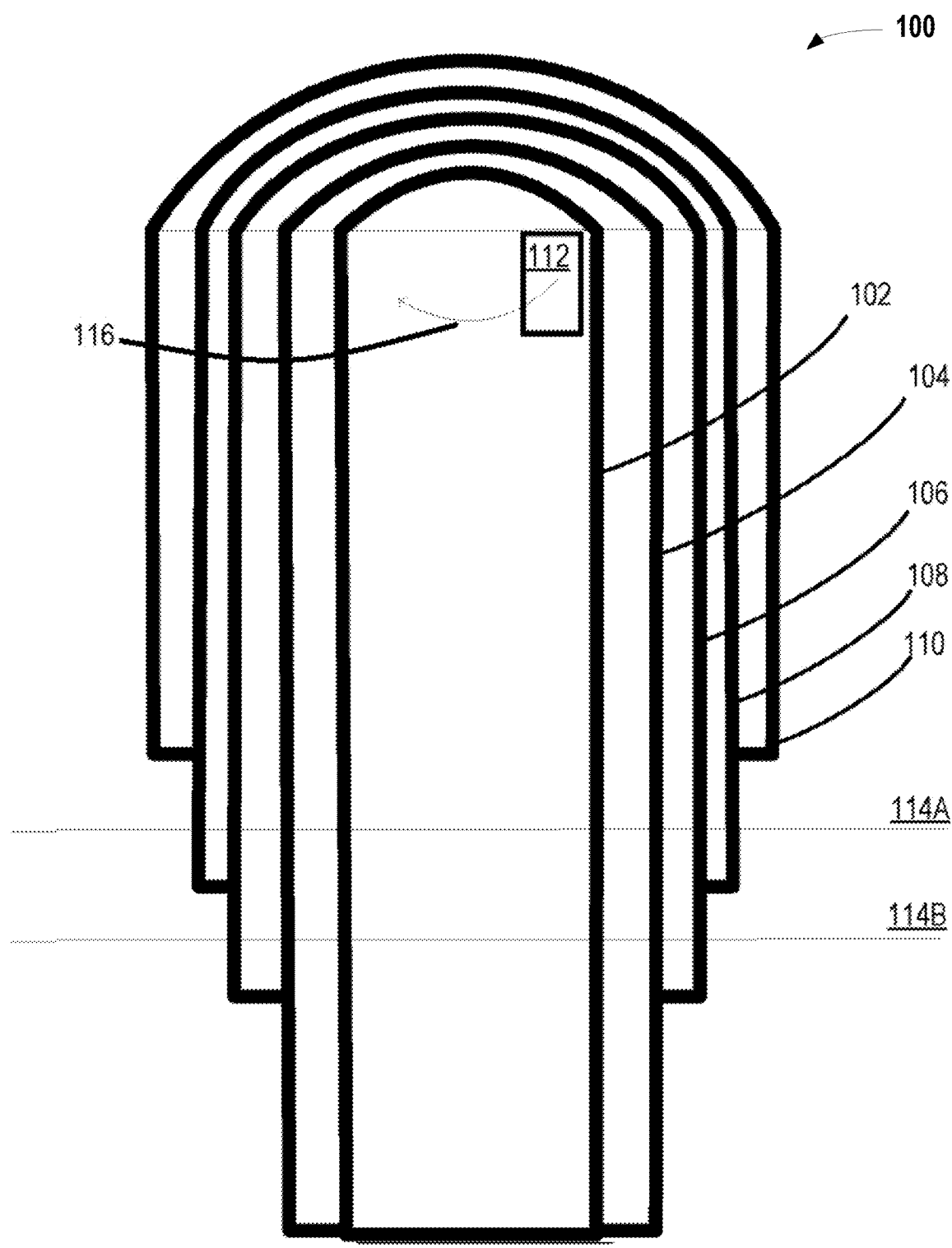
FIG. 1 is a partial cross-sectional view of a casing structure subject to a well inspection using a system or well inspect tool as detailed herein and in accordance with at least one embodiment.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

FIG. 1 is a partial cross-sectional view of a casing structure 100 subject to a well inspection using a system or well inspect tool as detailed herein and in accordance with at least one embodiment. Such a casing structure 100 may include barriers, such as a production tubing 102, a production casing 104, an intermediate casing 106, a surface casing 108, and a conductor casing 110. In at least one embodiment, such a casing structure 100 may include cemented casing forming some of the casing structure 100 or may include cement filling between annular spaces of the casing structure 100.

In at least one embodiment, a casing structure 100 herein may be part of a P&A well (also referred to herein as a casing structure) may be any type of well, including but not limited to conventional and unconventional hydrocarbon producing wells. A well inspection tool 112 may be deployed downhole into the casing structure 100 to perform various logging functions, such as detection of various anomalies, such as well defects, eccentricity, flaw structure, topology, integrity, and other information. In at least one embodiment, an intent for verification of casing loading may be to prevent flow paths in the cement that can allow hydrocarbon leakage for a P&A well, where such hydrocarbons may then appear on an environment surface. In at least one embodiment, the well inspection tool 100 may be part of or may fully include an acoustic-based imaging device for detecting integrity and defects of the casing structure 100. The casing structure 100 may therefore have one or a series of cylindrical metal casings and cement wall layers between the cylindrical metal casings. In at least one embodiment, the cement wall layers are subject to different stresses. For example, formation movement may be associated with loading from applied or natural materials, such as gas, liquids, light cement, and heavy cement.

As illustrated in FIG. 1, the well inspection tool 112 can traverse 116 into a casing structure 100 and may be used for determining integrity of the casing structure 100. In at least one embodiment, the well inspection tool 112 can be used to determine the integrity of each of the barriers (such as casings themselves and cement layers between the casings) and/or of a number of annular spaces between the barriers. The well inspection tool 112; 520 may include an acoustic signal generator component 516 (in FIG. 5), a transmitter 518 and a receiver 508. The well inspection tool 112; 520 may be deployed at the different depths inside the casing structure 100, and therefore has material and structural integrity to withstand the high pressures and high temperatures at these depths.

In at least one embodiment, such a method and system can reliably evaluate casing loadings and to identify isolation zones of a casing structure, particularly for a P&A well. While a variety of acoustic, such as sonic and ultrasonic, logging tools have been developed for cement evaluation, matured sonic logging tools that include VDL and cement bond logging (CBL) may rely on waves that are excited and received in a pitch-catch mode. In at least one example, an ultrasonic tool may be an isolation scanning tool. For such a tool, ultrasonic waves are generated, transmitted, and are acquired in a pulse-echo mode. Further, a segmented or a radial bond logging Tool (SBT or RBT) may be used. In at least one embodiment, however, deployments of these tools may be restricted to single casing well environments, due to limitations of hardware and/or data processing methods.

Figure 2:
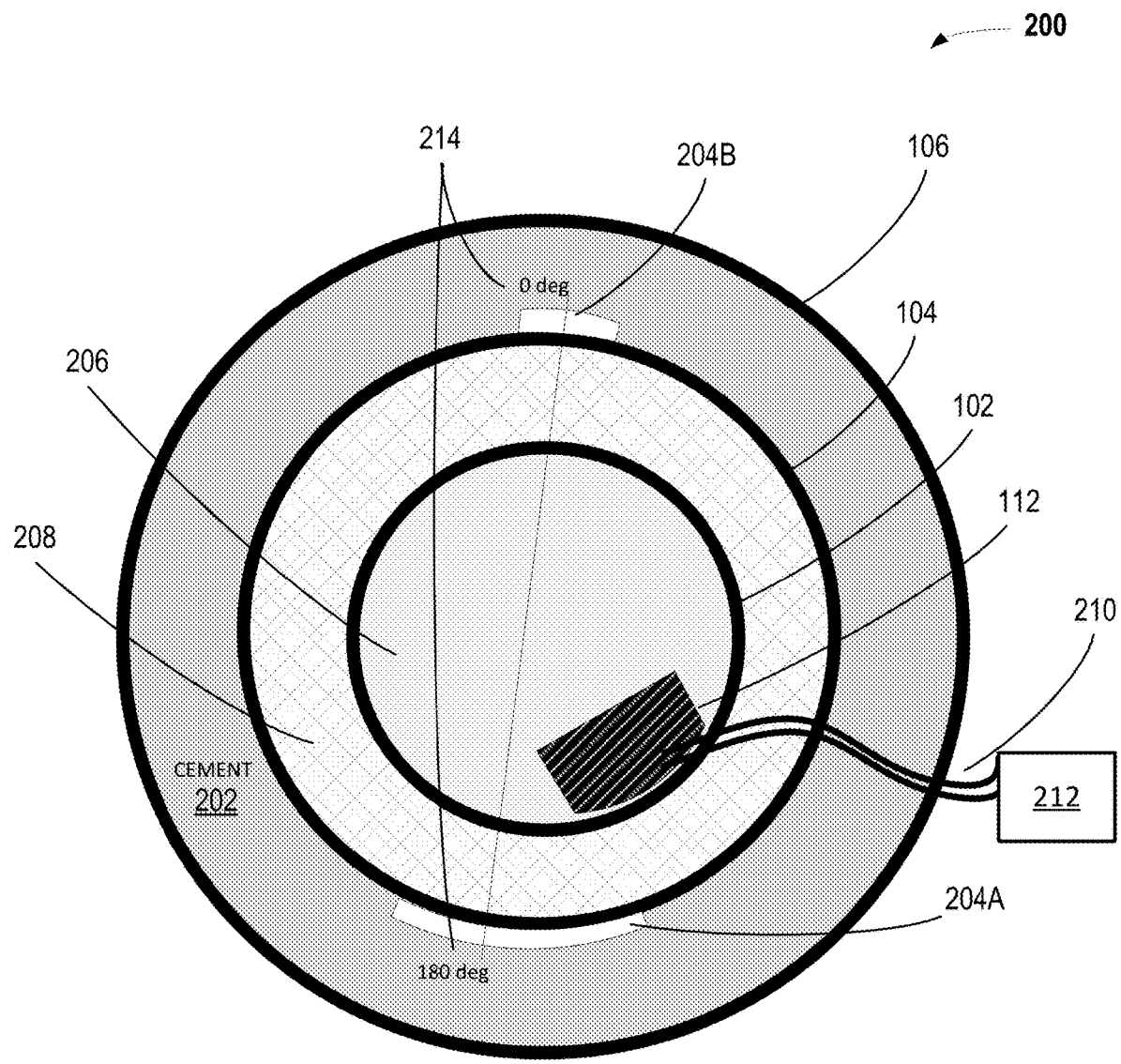
FIG. 2 is a plan view of a casing structure subject to a well inspection using a system or well inspect tool as detailed herein and in accordance with at least one embodiment.

FIG. 2 is a plan view of a casing structure subject to a well inspection method using a system or well inspect tool as detailed herein and in accordance with at least one embodiment. To improve accuracy and reliability of cement evaluation using through-tubing techniques, a well inspection tool 112 may be fully or partly within a casing structure 100; 200 to apply an entropy analysis technique to detect casing loadings of at least one cement 202 layer of the casing structure 100; 200. In at least one embodiment, such a well inspection tool may include a signal generator, transmitter, and receiver downhole, but may include a processor to execute instructions from a memory, where these aspects are located in one or more modules 212 on a surface or up-hole environment, relative to a downhole environment that is at least partly within the casing structure 100; 200.

In at least one embodiment, a transmitter of the well inspection tool 112 can transmit acoustic signals as pulse-echo measurements, of which the chirp pulse may be applied to enhance a sensitivity of such acoustic signals to external casing loadings of a casing structure 100; 200. In at least one embodiment, an acoustic impedance may be used to identify types of casing loadings for a single pipe. For a dual pipe string, third-interface echo (TIE) signals may be used to represent a signal reflected by the internal surface of production casing 104, and may be used in the analysis of the cement-bonding conditions and casing loadings. However, such TIE signals may be weak signals from the production casing 104 and may be sunk into strong echoes reflected by a production tubing 102. In at least one embodiment, such sinking of the weak TIE signals may be particularly the case for late time pulse-echo measurements.

Furthermore, variances caused by the casing loading may be even lower than uncontrollable intensity changes of the pulses intended for pulse-echo measurements. To address these aspects, entropy spectra generated from the return signals can suppress effects on the pulse-echo measurements caused the uncontrollable intensity changes of the pulses, where such an entropy spectra may be used for determining states of a tubing and a casing, and can be also used to quantify interferences of vibrations associated with these two pipes. All this information can be used to differentiate the casing loadings.

FIG. 2 also illustrates that the well inspection method herein can be used to determine cement-bonding conditions and casing loadings associated with the casing structure 100; 200, based at least in part on the entropy spectra. The cement bonding conditions pertain to the cement 202 located around the production casing 104, in at least one example. Therefore, the well inspection tool 112 provides an acoustic signal from the production tubing 102 through one or more media 206, 208 to the production casing 104. In at least one embodiment, the media may be water or hydrocarbons or mud. In at least one embodiment, as illustrated in FIG. 2, there may a free pipe or no bonding condition caused by gaps (here, illustrated as one or more slots 204A, B), a fully bonded condition (illustrated by a remainder of the cement 202, or a partial bonding condition (illustrated by intersections or physical changes from where a slot 204A; B starts and a remainder of the cement 202 occurs.

In at least one embodiment, a well inspection tool 112 may be fully self-sufficient to determine cement-bonding conditions and casing loadings associated with the casing structure 100; 200, based at least in part on the entropy spectra. For example, pitch-catch measurements herein can be used to detect cement bonding conditions while pulse-echo measurements herein may be used for detecting casing loading. In at least one embodiment, therefore, the well inspection tool 112 may include a processor to execute instructions from an associated memory without a need to communicate signals up-hole to a computer to perform such functions. In at least one embodiment, therefore, a module 212 having such a processor and memory may be located within the well inspection tool 112, may be associated with the well inspection tool 112 downhole, or may be located up-hole and may communicate with the well inspection tool 112 via wires 210 or wirelessly.

Figure 3A:
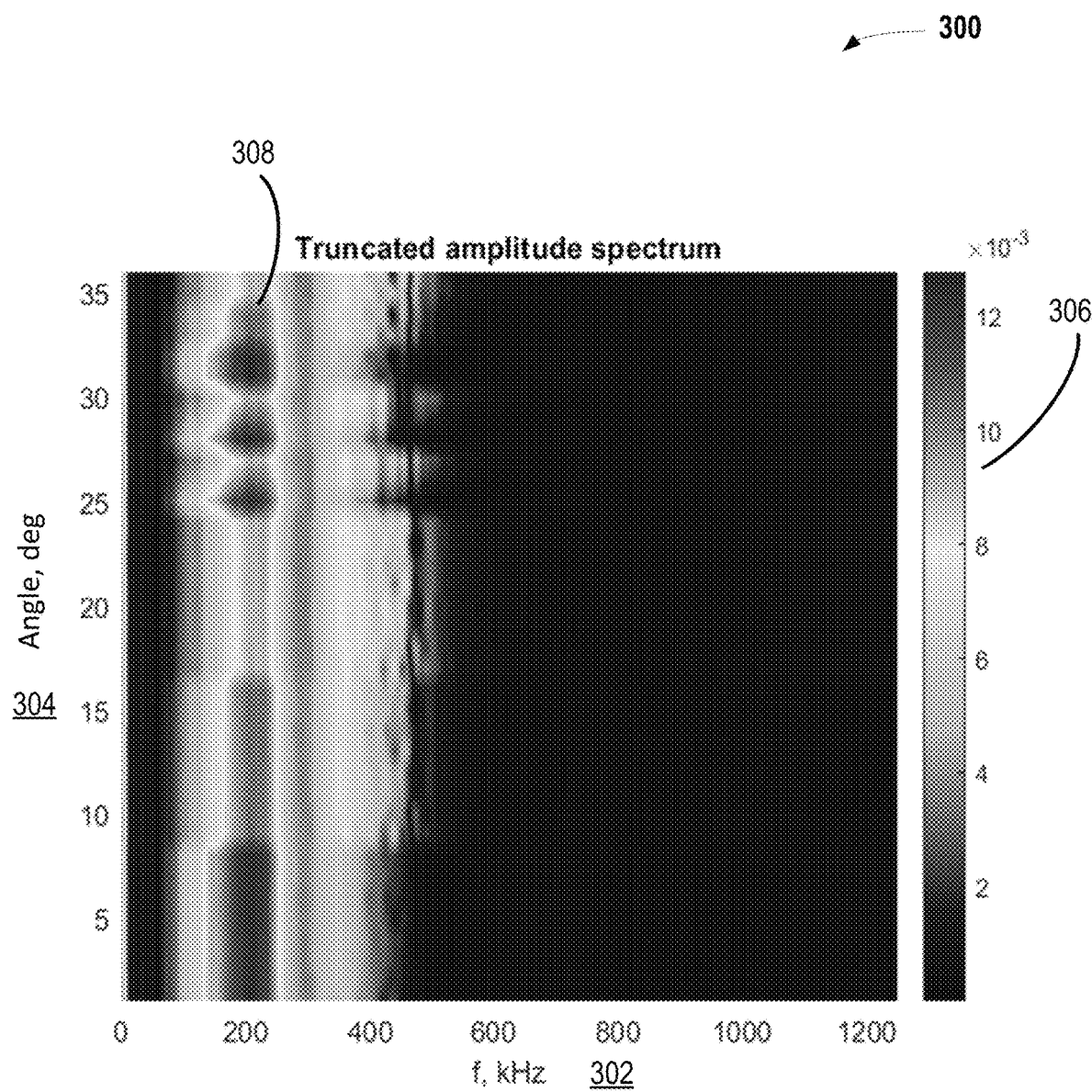
FIGS. 3A and 3B illustrate intermediate features enabled using at least one processor executing instructions comprised in a memory of a system for well inspection, in accordance with at least one embodiment.
Figure 3B:
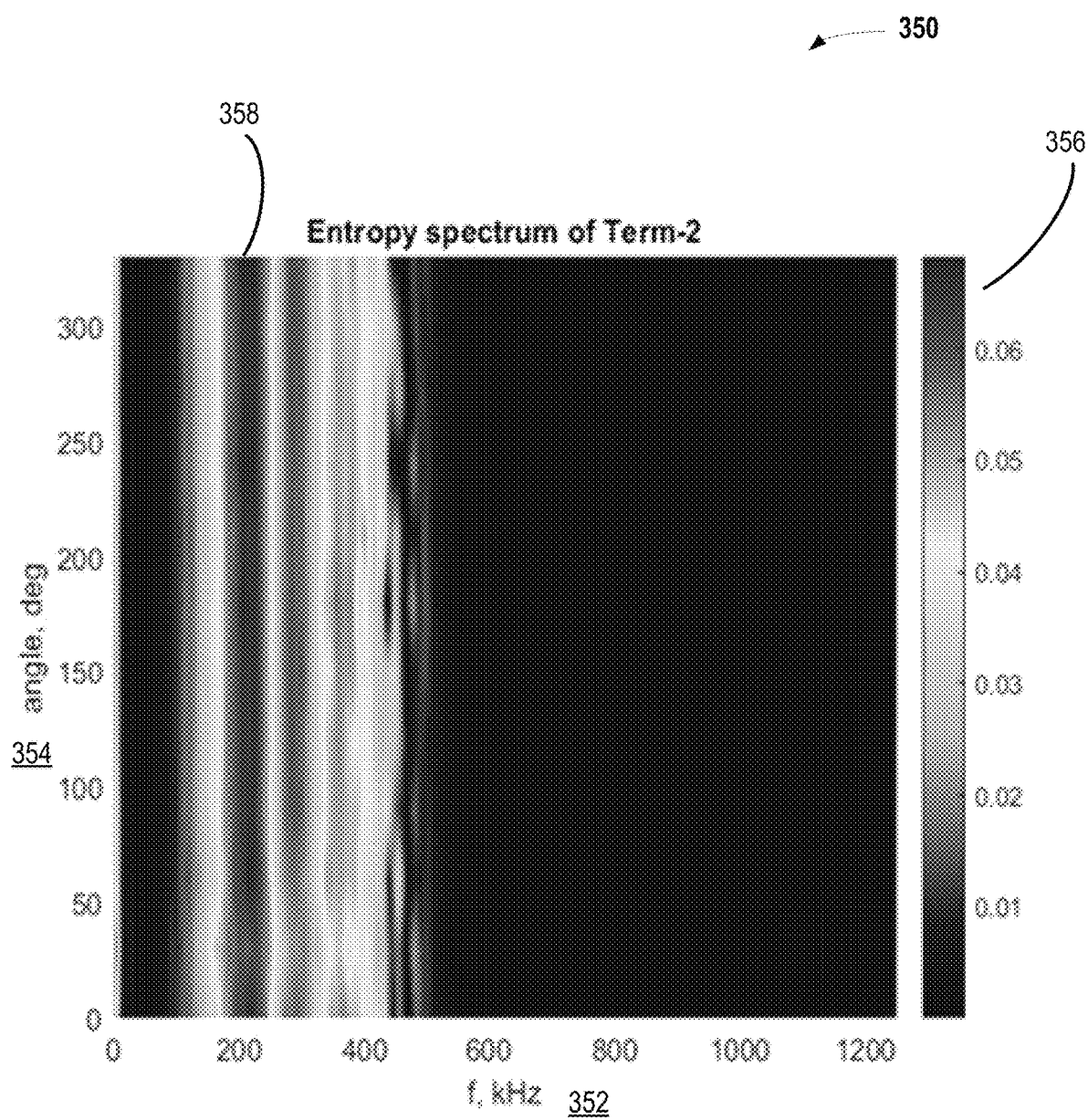

FIGS. 3A and 3B illustrate intermediate features 300, 350 enabled using at least one processor executing instructions comprised in a memory of a system for well inspection, in accordance with at least one embodiment. To determine the entropy spectra, a Fast Fourier Transform (FFT) may be performed on the return signals to generate spectrogram data. FIG. 3A illustrates a truncated amplitude spectrum 300, which is a part of a full amplitude spectrum, that would be generated from the FFT performed. In at least one embodiment, in the truncated amplitude spectrum 300, the x-axis corresponds to different frequencies 302, the y-axis corresponds to different angles of the azimuthal scan measurements 214; 304 of the production tubing 102 or production casing 104.

In at least one embodiment, the angle 214; 304 is a reference point with respect to a circumference of the production tubing 102 or the production casing 104 to indicate where from the acoustic signal is provided and where from the return signal is received. In at least one embodiment, the varying shades in the truncated amplitude spectrum 300 (also in the shading legend 306) represent the amplitude value of each of the lines of the frequency 302 and range from 2 to $12 \times 10^{-3}$.

In at least one embodiment, the FFT of a waveform is provided by:

$$X(k) = \sum_{n=0}^{N-1} x(n) W_N^{kn} = A(k) e^{j\Psi(k)}.$$ Equation (1)

Further, in Equation 1, $$x(n) = x(nT_s), \ W_N^{kn} = e^{-j\frac{2\pi}{N}kn}, \ f_s = \frac{1}{T_s}, \ \text{and} \ f_K = \frac{k}{N} f_s,$$

where the X(k) represents the $k^{th}$ harmonic, x(n) is the $n^{th}$ input sample, W is the exponential component in a circular frequency representation to convert the time domain to the frequency domain.

In at least one embodiment, a sampling frequency that satisfies the Nyquist-Shannon sampling theorem is used to acquire the return signals to avoid the alias of FFT spectrum of a return signal. Still further, a limited length of the return signal is used in such analysis. Therefore, the data underlying the amplitude spectrum that includes the truncated amplitude spectrum 300 in FIG. 3A, is referred to herein as the spectrogram data that is output from the FFT process.

In at least one embodiment, with the FFT performed, an entropy spectrum may be determined from the spectrogram data. To do so, a sum of a power spectrum for a waveform is determined. Then, the power spectrum is normalized using the sum of the power spectrum. Finally, a contribution of the individual frequency component of a waveform for the entropy spectrum is determined based in part on a natural logarithm of the normalized power spectrum.

In at least one embodiment, therefore, the power spectrum may be represented as:

$$P(k)=|X(k)|^2=[A(k)]^2$$ Equation (2).

In Equation (2), k=0, 1, . . . , N−1. In at least one embodiment, it may be difficult to analyze the return signals using the power spectrum at least in part because of the casing structure. For example, in some instances the acoustic signal may be strong and in other instances it may be weak. Further, it is difficult to determine whether an amplitude of a return signal is affected by the cement-bonding conditions, a pipe condition, or the source signals themselves. In at least one embodiment, instead of using the power spectrum to perform any analysis for casing loading, a defined entropy spectrum {E(k), k=0, 1, . . . , N−1} may be used, where the entropy specta may be based on the power spectrum and is defined as:

$$E(k)=-p(k)\log[p(k)]$$ Equation (3).

In Equation (3), the p(k) value is a normalized power spectrum and may be represented as:

$$p(k) = \frac{P(k)}{\sum_{j=0}^{N-1} P(j)}.$$ Equation (4)

Further, in Equation (4), {P(k), k=0, 1, . . . , N−1} is the FFT power spectrum of a selected echo of the pulse-echo measurements.

FIG. 3B illustrate intermediate features 350 enabled using at least one processor executing instructions comprised in a memory of a system for well inspection, in accordance with at least one embodiment. In at least one embodiment, the intermediate features 350 pertain to an entropy spectra of term-2 of a waveform. For pulse-echo mode measurements of dual pipe (such as including production tubing and production casing), the return signals have waveforms composed of multiple echoes reflected by the production tubing and multiple TIE signals reflected by an inner surface of production casing. The term-2 is the second time term of a waveform for determining the entropy spectra. Further, the waveform of term-2 or a later time term provides strong sensitivity to the casing loading, compared with term-1.

As illustrated, the entropy spectra having the intermediate features 350 is an image plotting frequency 352 against azimuthal angles 354, which is the combined set of entropy spectra of acquired waveforms at which cement loading are studied. In at least one embodiment, an azimuthal angle 354 may vary from 0 to 360 degree (such as with respect to a 360 degree circumference of such a tubing or casing) at which a return signal for pulse-echo mode measurements is excited, received and analyzed for the casing loadings at that angle. Further, the shading 356 provides the amplitudes associated with the frequency 352.

The power spectra and entropy spectra of waveforms have significant differences in features related to tubing, casing, casing loadings, and a source pulse, as demonstrated in the difference between FIGS. 3A and 3B. The edges of the shading 308 of the features 300 in the 200 to 300 KHz frequency bands of FIG. 3A is less prominent than the shading 358 of the features 350 of the same frequency bands of FIG. 3B (reference numeral 308 versus reference numeral 358), and therefore, this supports that accurate determination of casing loadings may be obtained by using an entropy spectra described herein. The feature 308 is of waveforms of the return signals, in amplitude spectra, and provides information that the acoustic signal has source pulses of the pulse-echo measurements at varied intensities. However, the feature 358 from the waveforms of the return signal, in the entropy spectra, reflect that effects on pulse-echo measurements caused by of variances in source pulse density of the pulse-echo measurements are suppressed in the entropy spectra.

Figure 4:
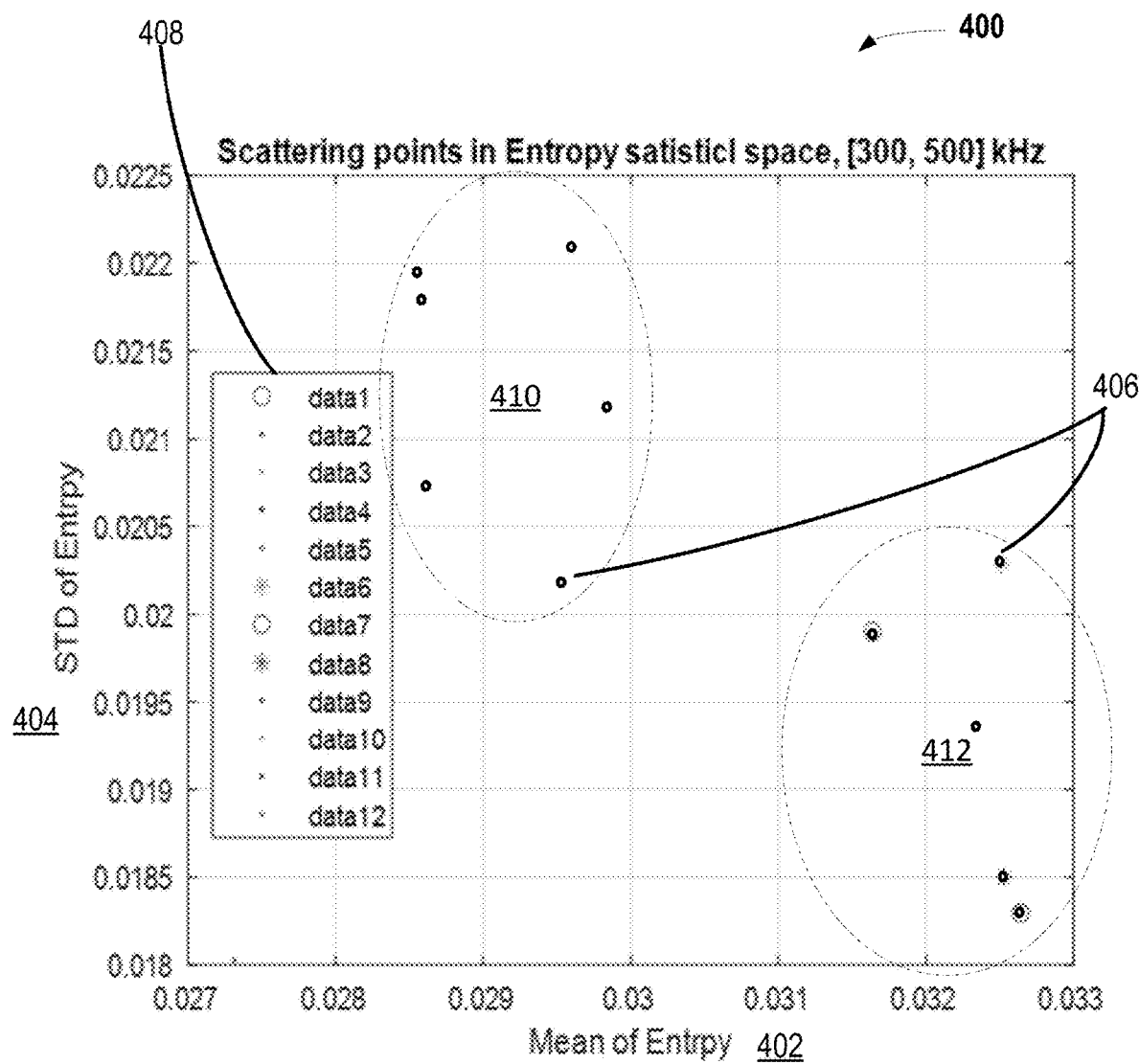
FIG. 4 illustrates a classification plot to support artificial intelligence/machine learning (AI/ML) features enabled by the well inspection method and system herein, in accordance with at least one embodiment.

FIG. 4 illustrates a casing loading classification plot 400 for artificial intelligence/machine learning (AI/ML) features enabled by the well inspection method and system herein, in accordance with at least one embodiment. In at least one embodiment, multiple features may be further extracted from an entropy spectrum for classifying the casing loadings with the presence of the tubing. In at least one embodiment, banded entropy, represented in Equation (5), is one feature that may be extracted from the entropy spectrum:

$$E_B = -\sum_{k=K_1}^{K_2} p(k)\log[p(k)].$$ Equation (5)

Here, p(k) is the amplitude of the normalized amplitude spectrum at the $k^{th}$ frequency component, as seen in Equation (4). The selection of a frequency component may be from a frequency range $[f_{K_1}, f_{K_2}]$ of a returned signal, and can depend on the frequency band of investigation, which may be related to the resonance of tubing or casing.

In at least one embodiment, a mean of entropy in a frequency band, as represented in Equation (6), is another statistical feature that may be extracted from the entropy spectrum:

$$\overline{E_B} = -\frac{1}{K_2 - K_1 + 1}\sum_{k=K_1}^{K_2} p(k)\log[p(k)]. \quad \text{Equation (6)}$$

This statistical feature may be defined to trace a state of a vibrated pipe. In at least one embodiment, the mean of entropy may include a value that varies with time and becomes zero when the pipe reaches to an equilibrium state.

In at least one embodiment, a standard deviation of the entropy spectra in a frequency band, as represented in Equation (7), is yet another statistical feature that may be extracted from the entropy spectrum:

$$\sigma_{E_B} = \left\{\frac{1}{K_2 - K_1}\sum_{k=K_1}^{K_2}\left[-p(k)\log p(k) - \overline{E_B}\right]^2\right\}^{1/2}. \quad \text{Equation (7)}$$

In at least one embodiment, such a statistical feature may be defined to differentiate fluid and cement loadings more effectively. For example, the cement loading may have a stronger dumpling effect at high frequencies and can cause more uncertainty to the state of a casing. Correspondingly, its standard deviation of the entropy spectra, at high frequency bands, may be larger than that for a fluid loading.

In at least one embodiment, such a classification plot 400 demonstrates that various data points 406 associated with a plurality of statistical features 402, 404 from the entropy spectra can be used in an AI/ML algorithm to train a classifier to infer the type of a casing loading from the entropy spectra. For example, a classification algorithm is enabled to classify entropy data associated with the plurality of statistical features 402, 404 into distinct classes or categories 410, 412. The classification algorithm may be based at least in part on a relationship between at least two of the plurality of statistical features 402, 404, in at least one embodiment. Further, the AI/ML algorithm then enables the determination of the cement loadings based at least in part on the entropy data classified within the distinct classes. In at least one embodiment, a first class 412 corresponds to flow paths in the cement and a second class 410 corresponds to no free paths in the cement.

In at least one embodiment, a K-means classifier, SVM classifier, kNN classifier, or a nearest neighbor classifier may be trained using the distinct classes 410, 412. Further, such a trained classifier may be used with newly received data of statistical features from an entropy spectra. Such a trained classifier can then classify the newly received into the distinct classes 410, 412 to enable the determination of the casing loadings based at least in part on the entropy data newly obtained for an P&A well or other well that includes concentric casing and/or tubing and that is cemented at one or more annular spaces. In at least one embodiment, further, such distinct classes 410, 412 of loading can provide information about fluid and cement loading or can provide information to be used in quality control during calibration of a system for determining casing loading using entropy spectra. In at least one embodiment, part of a training dataset from entropy spectra of simulated or modeled pulse-echo measurements with different casing loadings may be used to train a classifier, whereas other parts of the training dataset can be used for calibration of the classifier.

In at least one embodiment, the statistical features are extracted features that are directly related to the dumpling effect on the vibration of the casing caused by its loading. As such, the method and system herein does not need the assumption for the mud weight. Further, the entropy spectra can be used to conduct the data quality control (QC) of pulse-echo measurements. In at least one embodiment, such QC can reveal a floating zero-point issue, monitoring failures of establishments of resonances of tubing and casing, quantifying the interferences of vibrations of casing and tubing, and removing effects on pulse-echo measurements caused by unstable intensity of stimulate pulses. In at least one embodiment, therefore, the method and system herein are reliable and not sensitive to intensity of the stimulation pulse. Further, the banded entropy contrasts between fluid and cement loading of casing for the high frequency band can be more than 10%. The defined entropy features can be used to classify casing loadings, using machine learning methods.

In at least one embodiment, the disclosure herein uses a new classification method in a supported system to evaluate quality of cement external to at least one casing or production tubing using, based at least in part on statistical features from entropy spectra, where such statistical features can be classified in distinct classes using a classification algorithm. The statistical features can be classified based at least in part on a relationship between at least two of the statistical features. In at least one embodiment, the method herein is also applicable for both fresh and mature wells and can be performed fully downhole and in a combination of a downhole and a surface-based system.

Figure 5:
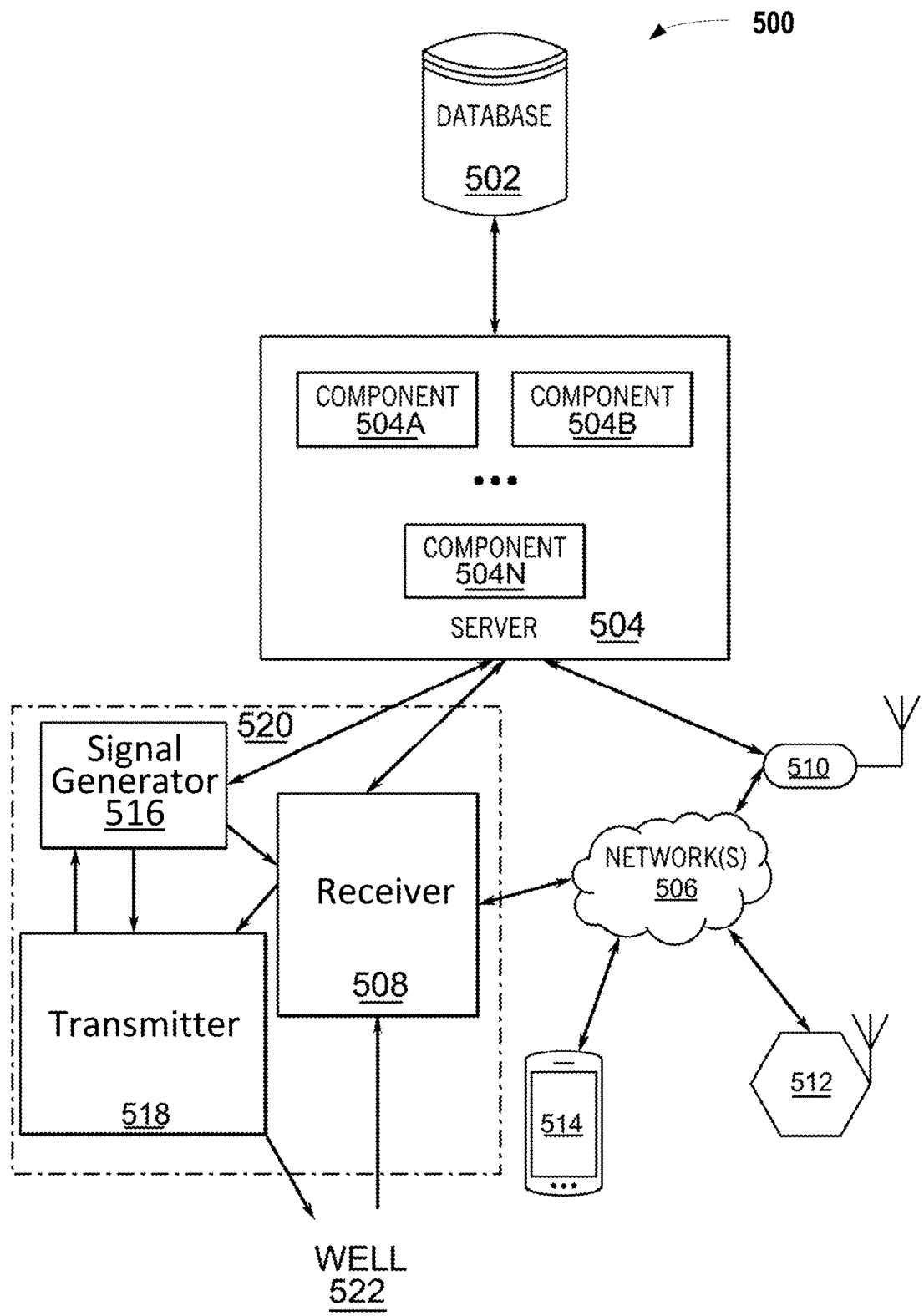
FIG. 5 is a block diagram of computer and network aspects for a well inspection system as described in FIGS. 1-4 herein, in accordance with at least one embodiment.

In at least one embodiment, computer, and network aspects 500 for a downhole system as illustrated in FIG. 5, may be used as described herein. In at least one embodiment, these computer and network aspects 500 may include a distributed system. In at least one embodiment, a distributed system 500 may include one or more computing devices 512, 514. In at least one embodiment, one or more computing devices 512, 514 may be adapted to execute and function with a client application, such as with browsers or a stand-alone application, and are adapted to execute and function over one or more network(s) 506.

In at least one embodiment, a server 504, having components 504A-N may be communicatively coupled with computing devices 512, 514 via network 506 and via a receiver device 508, if provided. In at least one embodiment, components 512, 514 include processors, memory, and random-access memory (RAM). In at least one embodiment, server 504 may be adapted to operate services or applications to manage functions and sessions associated with database access 502 and associated with computing devices 512, 514. In at least one embodiment, a server 504 may be associated with a receiver 508 of a downhole tool 520.

In at least one embodiment, server 504 may be at a wellsite location, but may also be at a distinct location from a wellsite location. In at least one embodiment, such a server 504 may support a downhole tool or wireline system 520 for analysis of a casing structure in a downhole environment and to perform casing structure inspection of a well 522. Such a well inspection tool 520 may be partly downhole and partly up-holes, such as at a surface level. Such a downhole tool 520 may include a well inspection tool that may be a combination of one or more of a signal generator 516, a transmitter 518, and a receiver 508 to perform at least part of the functions described throughout herein.

There may be a modelling system or signal generator 516 within a downhole tool 520 or separate from the downhole tool 520, at a server 504. In at least one embodiment, such a signal generator may be provided to perform part of the first set of steps of the algorithm to analyze or study casing loadings described throughout herein. In at least one embodiment, the signal generator 516 may be pre-calibrated on a surface level using known casing loadings or simulations (or other representations, including images) thereof.

The subsystems 508, 516, 518 of the downhole tool may be encased in one or more computing devices having at least one processor and memory so that the at least one processor can perform functions based in part on instructions from the memory executing in the at least one processor. In at least one embodiment, even though illustrated together, the system boundaries of each module 508, 516, 518 may be around a distributed system having the subsystems in different geographic locations, including downhole and surface areas.

In at least one embodiment, a receiver 508 of a downhole tool 520 is provided to receive return signals from a downhole environment of a well 522. In at least one embodiment, a system for determining casing loadings includes a wireline system for the analysis, where such a system may be adapted to transmit, either through wires or wireless, information received therein, from the receiver 508 back to the surface. In at least one embodiment, acoustic signaling performed using a signal generator 516 may be associated with calibration or pre-calibration of signals intended to test one or more casing loadings (and representations thereof) that may be recorded within a receiver 508 or the well inspection tool or downhole tool 520.

The signal generator 516 can communicate to a transmitter 518 and to a receiver 508 to enable determination of cement-bonding conditions of a well 522 using specific acoustic signals described throughout herein and using entropy analysis of return signals to classify statistical features therein against known casing loadings associated with distinct classes. For example, specific return signals associated with specific ones of the casing loadings can be verified as classifying in specific ones of the distinct classes using the above-described approaches.

Such return signals may include aspects of the transmitted acoustic signals to be applied from an acoustic transmitter 518. Detected return signals to the receiver 508 may be used to determine the casing loadings. In at least one embodiment, therefore, the system 500 enables the at least one processor (such as from components 504A-N, 512, 514 or in a server 504 or fully within a well inspection tool 520) to access the return signals, the entropy features extraction, the statistical features extraction, and to access classes of known casing loadings to perform the classification of the statistical features into the known classes.

In at least one embodiment, such returned signals may be received in the receiver 508 and transmitted from there if such a receiver 508 is a transceiver. In at least one embodiment, a server 504 may function as a setting device (with the acoustic transmitter of the well inspection tool providing the actual acoustic signal and the receiver receiving a returned signal). In at least one embodiment, however, the server 504 may also perform other functions described throughout herein and at least as to the algorithm described herein.

In at least one embodiment, one or more component 504A-N may be adapted to function as a signal provisioning device within a server 504 to enable the acoustic transmitter to transmit its signals at the frequency ranges described throughout herein. In at least one embodiment, one or more components 504A-N may include one or more processors and one or more memory devices adapted to function as a detector or receiver device, while other processors and memory devices in server 504 may perform other functions.

In at least one embodiment, a server 504 may also provide services or applications that are software-based in a virtual or a physical environment (such as to support the simulations referenced herein). In at least one embodiment, when server 504 is a virtual environment, then components 504A-N are software components that may be implemented on a cloud. In at least one embodiment, this feature allows remote operation of a system for determining casing loadings for formation using a wireline system that includes a well inspection tool, as discussed at least in reference to all the figures herein. In at least one embodiment, this feature also allows for remote access to information received and communicated between any of aforementioned devices. In at least one embodiment, one or more components 504A-N of a server 504 may be implemented in hardware or firmware, other than a software implementation described throughout herein. In at least one embodiment, combinations thereof may also be used.

In at least one embodiment, one computing device 510-514 may be a smart monitor or a display having at least a microcontroller and memory having instructions to enable display of information monitored by a receiver 508. In at least one embodiment, one computing device 510-512 may be a transmitter device to transmit directly to a receiver device or to transmit via a network 506 to a receiver 508 and to a server 504, as well as to other computing devices 512, 514.

In at least one embodiment, other computing devices 512, 514 may include portable handheld devices that are not limited to smartphones, cellular telephones, tablet computers, personal digital assistants (PDAs), and wearable devices (head mounted displays, watches, etc.). In at least one embodiment, other computing devices 512, 514 may operate one or more operating systems including Microsoft Windows Mobile®, Windows® (of any generation), and/or a variety of mobile operating systems such as iOS®, Windows Phone®, Android®, BlackBerry®, Palm OS®, and/or variations thereof.

In at least one embodiment, other computing devices 512, 514 may support applications designed as internet-related applications, electronic mail (email), short or multimedia message service (SMS or MMS) applications and may use other communication protocols. In at least one embodiment, other computing devices 512, 514 may also include general purpose personal computers and/or laptop computers running such operating systems as Microsoft Windows®, Apple Macintosh®, and/or Linux®. In at least one embodiment, other computing devices 512, 514 may be workstations running UNIX® or UNIX-like operating systems or other GNU/Linux operating systems, such as Google Chrome OS®. In at least one embodiment, thin-client devices, including gaming systems (Microsoft Xbox®) may be used as other computing device 512, 514.

In at least one embodiment, network(s) 506 may be any type of network that can support data communications using various protocols, including TCP/IP (transmission control protocol/Internet protocol), SNA (systems network architecture), IPX (Internet packet exchange), AppleTalk®, and/or variations thereof. In at least one embodiment, network(s) 506 may be a networks that is based on Ethernet, Token- Ring, a wide-area network, Internet, a virtual network, a virtual private network (VPN), a local area network (LAN), an intranet, an extranet, a public switched telephone network (PSTN), an infra-red network, a wireless network (such as that operating with guidelines from an institution like the Institute of Electrical and Electronics (IEEE) 802.11 suite of protocols, Bluetooth®, and/or any other wireless protocol), and/or any combination of these and/or other networks.

In at least one embodiment, a server 504 runs a suitable operating system, including any of operating systems described throughout herein. In at least one embodiment, server 504 may also run some server applications, including HTTP (hypertext transport protocol) servers, FTP (file transfer protocol) servers, CGI (common gateway interface) servers, JAVA® servers, database servers, and/or variations thereof. In at least one embodiment, a database 502 is supported by database server feature of a server 504 provided with front-end capabilities. In at least one embodiment, such database server features include those available from Oracle®, Microsoft®, Sybase®, IBM® (International Business Machines), and/or variations thereof.

In at least one embodiment, a server 504 is able to provide feeds and/or real-time updates for media feeds. In at least one embodiment, a server 504 is part of multiple server boxes spread over an area but functioning for a presently described process for analysis of a porous formation. In at least one embodiment, server 504 includes applications to measure network performance by network monitoring and traffic management. In at least one embodiment, a provided database 502 enables information storage from a wellsite, including user interactions, usage patterns information, adaptation rules information, and other information.

Figure 6:
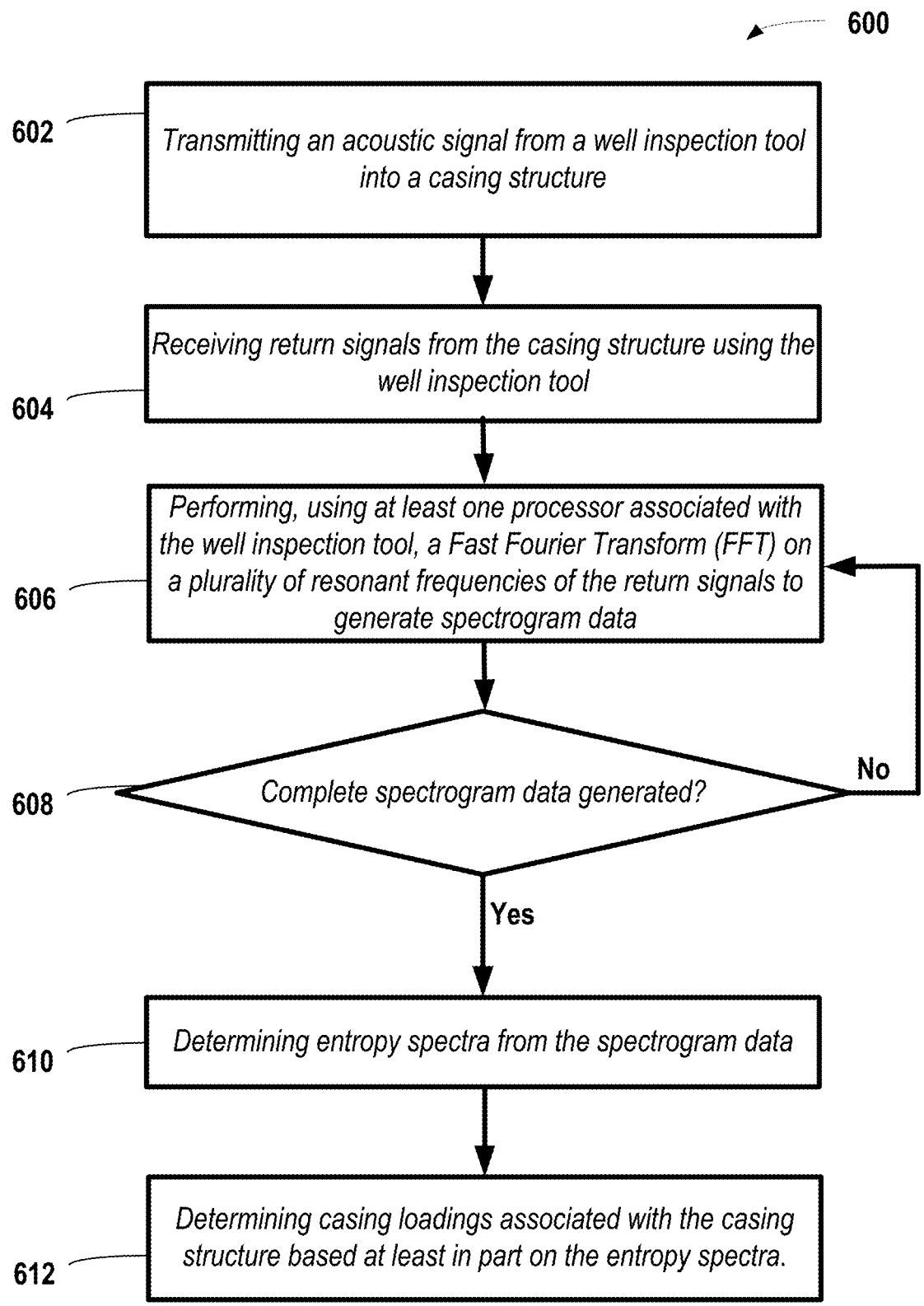
FIG. 6 is a flow diagram of a well inspection method to support the descriptions with respect to FIGS. 1-4 herein and used at least in part with the block diagram of FIG. 5, in accordance with at least one embodiment.

FIG. 6 is a flow diagram of a well inspection method 600 to support the descriptions with respect to FIGS. 1-4 herein and used at least in part with the block diagram of FIG. 5, in accordance with at least one embodiment. In at least one embodiment, a well inspection method 600 includes transmitting (602) an acoustic signal from a well inspection tool into a casing structure. The method 600 includes receiving (604) return signals from the casing structure to the well inspection tool. A step in the method 600 is for performing (606), using at least one processor associated with the well inspection tool, a Fast Fourier Transform (FFT) on a plurality of resonant frequencies of the return signals to generate spectrogram data. A step in the method 600 includes verifying (608) that a complete spectrogram data is generated.

In at least one embodiment, upon positive verification in step 608, a step of the method 600 is for determining (610) an entropy spectrum from the spectrogram data. Otherwise, step 606 in the method 600 may be repeated till complete spectrogram data is generated. In at least one embodiment, the method 600 includes determining (612) casing loadings associated with the casing structure based at least in part on the entropy spectra. In at least one embodiment, step 612 may be performed using classification of the statistical features of the entropy data or may be performed using the entropy data itself, such as an interpretation of the terms in the entropy spectra from FIG. 3B.

In at least one embodiment, the method 600 includes a further step or substep for providing the well inspection tool internally within a production tubing. The production tubing may be internally within a casing and the casing loadings may be associated with cement located externally relative to the casing. In at least one embodiment, this is a dual pipe setup. In at least one embodiment, the method 600 includes a further step or substep for providing the well inspection tool internally within a casing. The casing loadings may be associated with cement located externally relative to the casing. In at least one embodiment, this is a single pipe setup.

In at least one embodiment, the method 600 includes a further step or substep for enabling the well inspection tool to include a contact transceiver or a padded transceiver to provide the acoustic signal from different circumferential positions that are within the casing structure towards walls of the casing structure. In at least one embodiment, the method 600 includes a further step or substep for determining a plurality of statistical features from the entropy spectra. In at least one embodiment, this may be as described with respect to FIGS. 3B and 4. In at least one embodiment, the method 600 includes a further step or substep for enabling a classification algorithm to classify entropy data associated with the plurality of statistical features into distinct classes. The classification algorithm may be based at least in part on a relationship between at least two of the plurality of statistical features. In at least one embodiment, the method 600 includes a further step or substep for enabling the determination of the casing loadings based at least in part on the entropy data classified within the distinct classes.

In at least one embodiment, the method 600 includes a further step or substep for determining a power spectrum for individual waveforms of the spectrogram data. The method 600 includes a further step or substep for determining a sum of the power spectrum for the for individual waveforms. Still further, the method 600 includes a step or substep for normalizing the power spectrum using the sum of the power spectrum. Finally, the method 600 includes a further step or substep for determining a contribution of the individual waveforms for the entropy spectra based in part on a natural logarithm of the normalized power spectrum.

In at least one embodiment, the casing loadings described herein includes one of a free paths or loadings caused by one or more of oil, gas, heavy cement, or light cement. In at least one embodiment, the method 600 includes a further step or substep for providing the well inspection tool internally within a production tubing. The production tubing is internally within a casing. There may be media provided within the production tubing and within an annular space of the casing and the production tubing. Such media, in at least one embodiment, may be water or a combination of water and oil.

In at least one embodiment, the method 600 includes a further step or substep for determining a first resonant frequency of the plurality of resonant frequencies as associated with the production tubing. In at least one embodiment, the method 600 includes a further step or substep for determining a state of second resonant frequency of the plurality of resonant frequencies. The state of the second resonant frequency may be associated with the casing loadings for the casing. For example, the state of the second resonant frequency corresponds to a presence or an absence of the second resonant frequency. In at least one embodiment, this information may be used for calibrating the well inspection tool or to identify errors in the pipes before or during a process in the method 600 for inspecting casing loadings in a casing structure.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

Operations of methods in FIG. 6 and the algorithm herein can be performed in any suitable order unless otherwise indicated herein or otherwise clearly contradicted by context. In at least one embodiment, a method includes processes such as those processes described herein (or variations and/or combinations thereof) that may be performed under control of one or more computer systems configured with executable instructions and that may be implemented as code (e.g., executable instructions, one or more computer programs or one or more applications) executing collectively or exclusively on one or more processors, by hardware or combinations thereof.

In at least one embodiment, such code may be stored on a computer-readable storage medium. In at least one embodiment, such code may be a computer program having instructions executable by one or more processors. In at least one embodiment, a computer-readable storage medium is a non-transitory computer-readable storage medium that excludes transitory signals (such as a propagating transient electric or electromagnetic transmission) but includes non-transitory data storage circuitry (such as buffers, cache, and queues) within transceivers of transitory signals. In at least one embodiment, code (such as executable code or source code) is stored on a set of one or more non-transitory computer-readable storage media having stored thereon executable instructions (or other memory to store executable instructions) that, when executed (such as a result of being executed) by one or more processors of a computer system, cause computer system to perform operations described herein.

In at least one embodiment, a set of non-transitory computer-readable storage media includes multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit (CPU) executes some of instructions while other processing units execute other instructions. In at least one embodiment, different components of a computer system have separate processors and different processors execute different subsets of instructions.

In at least one embodiment, computer systems are configured to implement one or more services that singly or collectively perform operations of processes described herein and such computer systems are configured with applicable hardware and/or software that enable performance of operations. In at least one embodiment, a computer system that implements at least one embodiment of present disclosure is a single device or is a distributed computer system having multiple devices that operate differently such that distributed computer system performs operations described herein and such that a single device does not perform all operations.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A well inspection method, comprising:
   transmitting an acoustic signal from a well inspection tool into a casing structure;
   receiving return signals from the casing structure using the well inspection tool;
   performing, using at least one processor associated with the well inspection tool, a Fast Fourier Transform (FFT) on the return signals to generate spectrogram data;
   determining entropy spectra from the spectrogram data; and
   determining casing loadings associated with the casing structure based at least in part on the entropy spectra.

2. The well inspection method of claim 1, further comprising:
   providing the well inspection tool internally within a production tubing, the production tubing being internally within a casing, wherein the casing loadings are associated with cement located externally relative to the casing.

3. The well inspection method of claim 1, further comprising:
   providing the well inspection tool internally within a casing, wherein the casing loadings are associated with cement located externally relative to the casing.

4. The well inspection method of claim 1, further comprising:
   enabling the well inspection tool to comprise a contact transceiver or a padded transceiver to provide the acoustic signal from different circumferential positions that are within the casing structure towards walls of the casing structure.

5. The well inspection method of claim 1, further comprising:
   determining a plurality of statistical features from the entropy spectra;
   enabling a classification algorithm to classify entropy data associated with the plurality of statistical features into distinct classes, the classification algorithm based at least in part on a relationship between at least two of the plurality of statistical features; and
   enabling the determination of the casing loadings based at least in part on the entropy data classified within the distinct classes.

6. The well inspection method of claim 1, further comprising:
   determining a power spectrum for at least one of the return signals;
   determining a sum of the power spectrum;
   normalizing the power spectrum using the sum of the power spectrum; and
   determining the entropy spectra based in part on a natural logarithm of the normalized power spectrum.

7. The well inspection method of claim 1, wherein the casing loadings comprise one of a free path condition or different material loadings.

8. The well inspection method of claim 1, further comprising:
   providing the well inspection tool internally within a production tubing, the production tubing being internally within a casing, wherein a media is provided within the production tubing and within an annular space of the casing and the production tubing.

9. The well inspection method of claim 8, further comprising:
   determining a first resonant frequency of a plurality of resonant frequencies as associated with the production tubing; and
   determining a state of a second resonant frequency of the plurality of resonant frequencies, wherein the state of the second resonant frequency is associated with the casing loadings for the casing.

10. The well inspection method of claim 1, wherein the entropy spectra is used to quantify interferences of vibrations associated with the casing structure.

11. A system for well inspection, comprising:
    a transmitter of a well inspection tool to transmit an acoustic signal into a casing structure;
    a receiver of the well inspection tool to receive return signals from the casing structure to the well inspection tool; and
    at least one processor and memory comprising instructions that when executed by the at least one processor enable the system to:
    perform a Fast Fourier Transform (FFT) on a plurality of resonant frequencies of the return signals to generate spectrogram data;
    determine an entropy spectra from the spectrogram data; and
    determine casing loading associated with the casing structure based at least in part on the entropy spectra.

12. The system of claim 11, wherein at least part of the system is to be internally within a production tubing, the production tubing being internally within a casing, wherein the casing loadings are associated with cement located externally relative to the casing.

13. The system of claim 11, wherein at least part of the system is to internally within a casing, wherein the casing loadings are associated with cement located externally relative to the casing.

14. The system of claim 11, wherein the system further comprises a contact transceiver or a padded transceiver to provide the acoustic signal from different circumferential positions that are within the casing structure towards walls of the casing structure.

15. The system of claim 11, wherein the memory comprising the instructions that when executed by the at least one processor further cause the system to:
    determine a plurality of statistical features from the entropy spectra;

enable a classification algorithm to classify entropy data associated with the plurality of statistical features into distinct classes, the classification algorithm based at least in part on a relationship between at least two of the plurality of statistical features; and enable the determination of the casing loadings based at least in part on the entropy data classified within the distinct classes.

16. The system of claim 11, wherein the memory comprising the instructions that when executed by the at least one processor further cause the system to:

determine a power spectrum for the return signals;

determine a sum of the power spectrum;

normalize the power spectrum using the sum of the power spectrum; and determining the entropy spectra based in part on a natural logarithm of the normalized power spectrum.

17. The system of claim 11, wherein the casing loadings comprise one of a free path condition or different material loadings.

18. The system of claim 11, wherein at least part of the system is internally within a production tubing, the production tubing being internally within a casing, wherein a media is provided within the production tubing and within an annular space of the casing and the production tubing.

19. The system of claim 11, wherein the memory comprising the instructions that when executed by the at least one processor further cause the system to:

determine a first resonant frequency of a plurality of resonant frequencies as associated with the production tubing; and determine a state of a second resonant frequency of the plurality of resonant frequencies, wherein the state of the second resonant frequency is associated with the casing loadings for the casing.

20. The system of claim 11, wherein the memory comprising the instructions that when executed by the at least one processor further cause the system to:

use the entropy spectra to quantify interferences of vibrations associated with the casing structure.

* * * * *